UNITED STATES PATENT OFFICE.

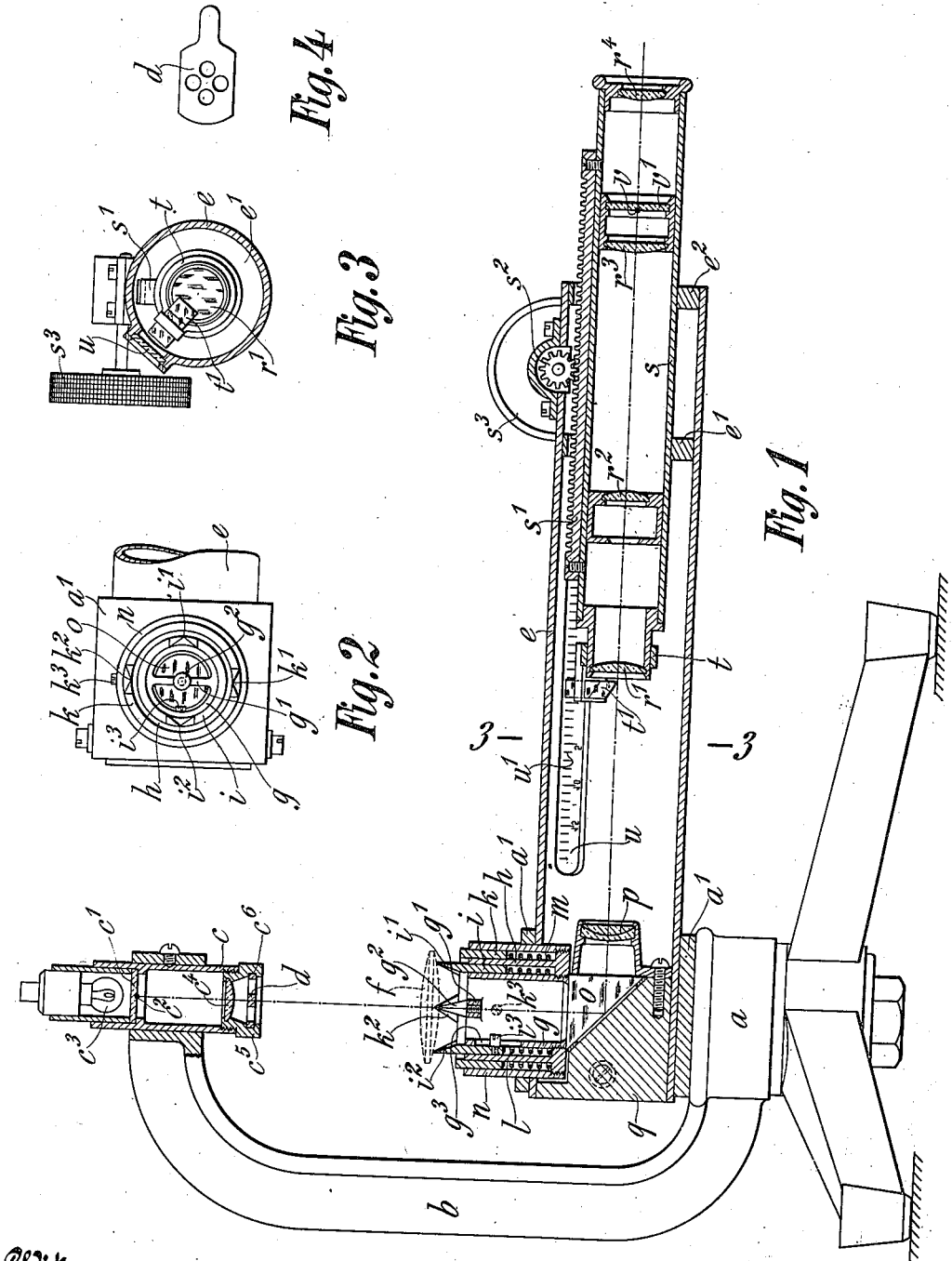

OTTO HENKER, OF JENA, GERMANY, ASSIGNOR TO THE FIRM OF CARL ZEISS, OF JENA, GERMANY.

APPARATUS FOR TESTING LENS SYSTEMS.

1,305,980.  Specification of Letters Patent.  Patented June 3, 1919.

Application filed May 23, 1914. Serial No. 840,605.

*To all whom it may concern:*

Be it known that I, OTTO HENKER, a citizen of the German Empire, residing at Jena, Germany, have invented a new and useful Apparatus for Testing Lens Systems, of which the following is a specification.

The invention relates to an apparatus for testing lens systems, this collective term comprising not only systems of more than one member, but single lenses as well. The apparatus is intended to be used for experimentally measuring or testing the so called intersectional distance of lens systems. As is well known, the term intersectional distance denotes the distance of a focus from the end surface of the system facing it; hence, the intersectional distance is equal to the focal distance of the system only for lenses, the thickness of which is infinitesimal, while for lenses of finite thickness and for all systems of more than one member intersectional distance and focal distance are different. It is, therefore, frequently necessary or desirable in practice, to be able to measure and test the intersectional distance of a lens system in a simple manner. This is important, for instance, when choosing the spectacle glass required for an abnormal eye, as in the case of spectacle glasses the intersectional distance forms an important determining factor, as soon as the thickness of the glass is no longer infinitesimal.

For ascertaining the intersectional distance the image of an infinitely distant sighting mark, which may be presented in the simplest manner by a collimator, will be formed by the lens system to be examined, and thereupon the distance between the focus lying in the image-plane and the end surface of the system facing it will be measured. According to the invention an apparatus intended for this purpose may be given a particularly simple and suitable form by a fixed stop being provided, against which the vertex of the lens system to be examined is to be placed, so that the distance of the vertex from the locus of the image formed and by this means the intersectional distance may be measured.

In order to be able to determine the intersectional distance of negative lens systems as well, an additional collective lens system of greater power will be employed, which system is preferably formed as a fixed part of the apparatus. It is then only necessary, after having ascertained the intersectional distance, to take into account the constant corresponding to the said collective auxiliary system or to mark a scale fitted directly to the apparatus with suitable numerals. For ascertaining the position of the image of the sighting mark the use of an ocular is to be recommended, with which the image of the mark is observed and focused sharply. In order to obtain a large measuring range and the considerable ocular extension necessary under such circumstances, a terrestrial ocular or a microscope will be employed. Furthermore the employment of an ocular results in a simplified manipulation of the apparatus, if a scale, which is fitted to the apparatus and is graduated directly according to intersectional distances (or their reciprocals, *i. e.* according to so-called vertex refractions) of the lens systems to be examined, be reflected with the aid of a reflecting device in the field of view of the ocular, so that, while the image-plane of the sighting mark is being focused, the intersectional distance belonging to it may at the same time be read off.

In order to keep the lens system in its place, while a measurement is being made, it will be given besides the vertex stop a lateral support as well, which will preferably be arranged to adapt itself by spring action to the curvature of the end surface of the system. For spherical bounding surfaces a cylindrical sleeve may, for instance, be used, which is disposed concentrically with the vertex stop, is guided in the direction of the sighting axis and is pressed against the lens system by means of a helical spring, so that the sleeve will be in contact all around, when the system is in the proper position. When the lens system has a twofold symmetrical end surface, *e. g.* a cylindrical or a toric one, the system will be preferably supported in four points by four yielding pins, of which each two pins lying symmetrically to the vertex stop are coupled together and are guided in such a manner that their connecting line is always perpendicular to that of the other two pins. The lens system must then, on being placed in the apparatus, be displaced or rotated about its axis, until all four pins contact simultaneously with the end surface.

The accurate setting of an ocular or of a translucent screen to the image-locus of the sighting mark is simplified by a well-known method, by a diaphragm with two holes being located in the path of the rays in front of the lens system to be examined. When astigmatic lens systems are being tested, the line connecting the centers of the holes must be approximately perpendicular to the focal line set for. Hence, in order to be able with such systems to set the two focal lines one after the other without a rotation of the diaphragm, the latter will be preferably provided with four holes, which are disposed in such a manner that the connecting lines of two opposite hole centers each pass through the sighting axis and are approximately perpendicular to one another. On placing the lens system to be tested in the apparatus, care must then be taken, that each two opposite hole centers come to lie approximately in the direction of one of the two principal planes of the lens system.

In the annexed drawing a constructional example of the invention is shown, in which for the sake of convenience in the manipulation of the apparatus the optical axis is deflected about in the middle of the apparatus through 90° by a reflecting prism. The apparatus is so constructed that the intersectional distance of systems with twofold symmetrical end surfaces may also be determined. Figure 1 is a longitudinal section through the whole apparatus, Fig. 2 shows the plan view of the supporting device for the lens system to be examined, Fig. 3 is a cross-section through the apparatus along line 3—3 of Fig. 1 and Fig. 4 a detail of the apparatus.

A stand $a$ supports on a lateral arm $b$ a casing $c$, which in its turn contains a collimator. The sighting mark $c^2$ of the collimator, which is on a mark-carrier $c^1$ is illuminated by an electric incandescent lamp $c^3$ and an infinitely distant virtual image of it is formed by the collimator lens $c^4$. Behind the lens $c^4$ and in its mount $c^5$ there is a slot-shaped recess $c^6$, into which is inserted a diaphragm $d$ having four holes.

The measuring apparatus proper is inclosed in a tubular casing $e$, which is fixed at its left-hand end in a socket $a^1$ on the stand $a$. The supporting device for the lens system to be examined, which system is indicated in the drawing in dotted lines by a lens $f$, is built into the said tube end. Across a cylindrical sleeve $g$, in the direction of a diameter of the same, is a bridge $g^1$, to the center of which is fixed a point $g^2$, which forms the fixed vertex stop for the lens $f$. For the lateral support of the lens $f$ there are provided two cylindrical guide-pieces $i$ and $k$, which are concentric with the sleeve $g$ and are separated by an intermediate sleeve $h$. Each of these guide-pieces is provided at the top with two equally high, oppositely positioned points $i^1$, $i^2$ and $k^1$, $k^2$ respectively and is pressed by means of a helical spring $l$ and $m$ respectively in the direction of the axis upwardly against the lens $f$. An outer sleeve $n$, to which the intermediate-sleeve $h$ and the inner sleeve $g$ are fixed, serves for journaling the whole supporting device in the socket $a^1$. The guide-piece $i$ is provided with a screw $i^3$, which slides in a straight slot $g^3$ of the fixed sleeve $g$ parallel to the axis, so that the points $i^1$ and $i^2$ of the guide-piece $i$ may always move in a straight line parallel to the sighting axis. The same object is attained for the guide-piece $k$ by a screw $k^3$, which is fixed to the said piece, and a corresponding slot in the sleeve $n$, the various parts being so arranged that the connecting line of two corresponding points is perpendicular to that of the other two points. On placing the lens to be tested on the apparatus, the lens must be pressed downward with the hand and be shifted or turned, until it rests simultaneously both on the vertex stop and on all four supporting points.

A reflecting prism $o$ abuts on the lower end of the sleeve $g$, which prism transmits the ray pencils to a collective system $p$, which is fixed within the apparatus. Both the prism $o$ and the system $p$ are fixed to a cylindrical piece $q$, which closes the casing $e$. For observing and focusing the image of the sighting mark, produced by the lens $f$ and the system $p$, there is provided a terrestrial ocular formed of four plano-convex lenses $r^1$, $r^2$, $r^3$ and $r^4$, the containing tube $s$ of which is guided in two rings $e^1$ and $e^2$ fixed to the casing $e$. The movement of the ocular is effected by means of a rack $s^1$ through a pinion $s^2$ and a milled disk $s^3$. A reflecting prism $t^1$ is fixed by means of a ring $t$ at the front end of the ocular and reflects a scale $u^1$, which is fitted to a glass plate $u$ and is lighted from without, into the field of view of the ocular. The mark $v$ for reading off the scale $u^1$ is fitted in the image-plane of the ocular, lying between the two lenses $r^3$ and $r^4$, to a mark-carrier $v^1$.

I claim:

1. Apparatus for testing lens systems, comprising a collimator adapted to present an image of its sighting mark, a collective system fixed to the apparatus, which is adapted to form along with the lens system to be tested a real image of the said image, a terrestrial ocular adapted for ascertaining the position of the said real image and supporting means for the lens system to be tested, comprising a fixed stop adapted to contact with the vertex of the said lens system.

2. Apparatus for testing lens systems having on the side to be examined a twofold symmetrical surface, comprising a collimator adapted to present an image of its sighting mark, a collective system fixed to the apparatus, which is adapted to form along with the lens system to be tested a real image of the said image, and supporting means for the lens system to be tested, comprising a fixed stop and four yieldingly journaled pins surrounding the said stop, which are coupled together in diametrically opposite pairs with symmetrically disposed members and are so guided that the connecting lines of such pairs, which pass through the axis of the fixed stop, are always perpendicular to each other, the fixed stop being adapted to contact with the vertex of the lens system to be tested.

3. Apparatus for testing astigmatic lens systems, comprising a collimator adapted to present an image of its sighting mark, a collective system fixed to the apparatus, which is adapted to form along with the lens system to be tested a real image of the said image, a diaphragm provided with four holes and adapted to be introduced into the path of the rays in front of the lens system to be tested, and supporting means for the lens system to be tested, comprising a fixed stop adapted to contact with the vertex of the said lens system.

OTTO HENKER.

Witnesses:
PAUL KRUGER,
RICHARD HAHN.